Feb. 24, 1942.                R. C. McCOY                2,274,151
                     CORE MAKING AND FILLING DEVICE
                          Filed June 19, 1941
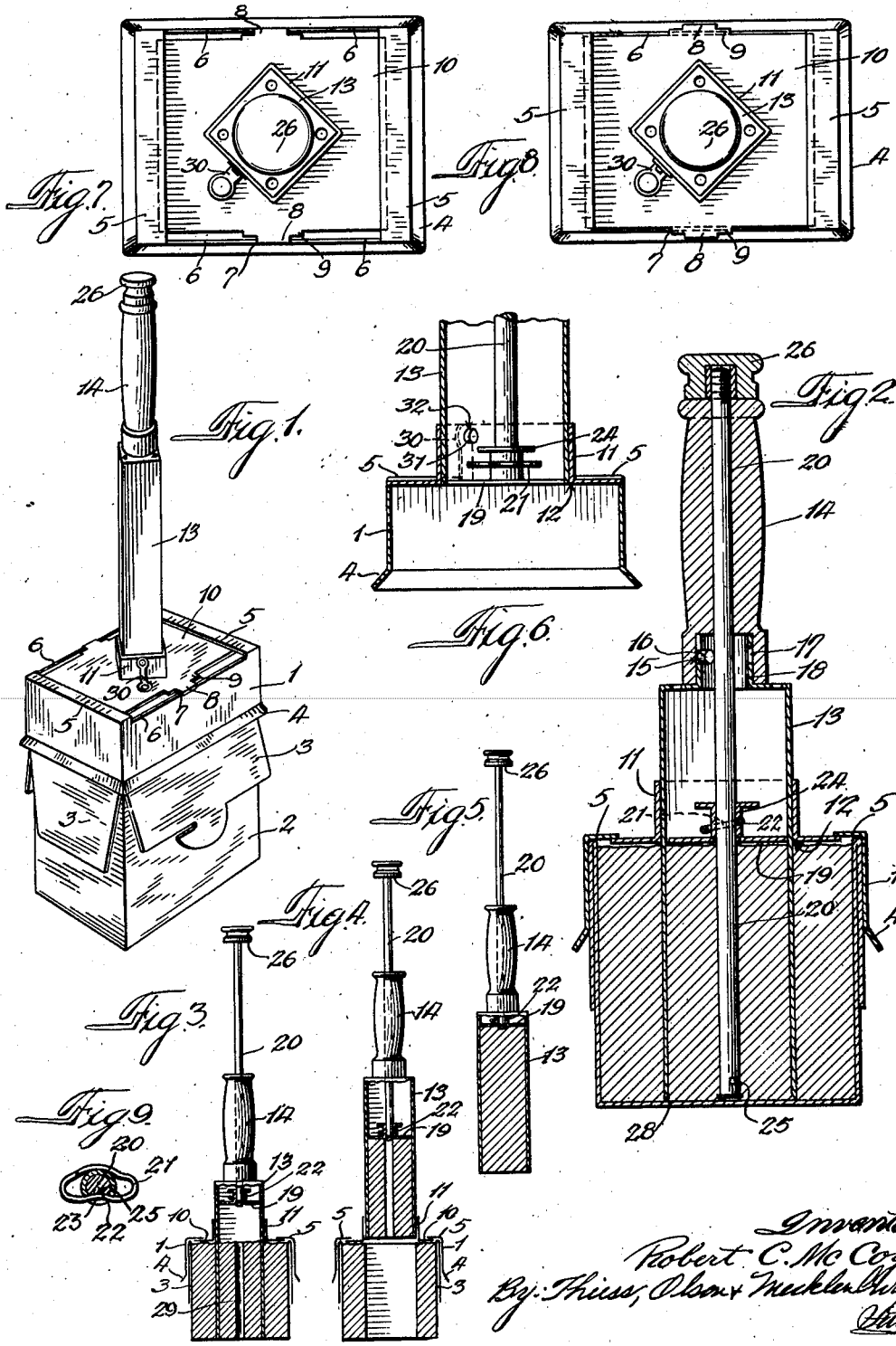

Patented Feb. 24, 1942

2,274,151

UNITED STATES PATENT OFFICE 2,274,151

CORE MAKING AND FILLING DEVICE

Robert C. McCoy, Madison, Wis.

Application June 19, 1941, Serial No. 398,722

10 Claims. (Cl. 107—1)

This invention relates to an improved form of device for incorporating fillers in normally unstable products and particularly in frozen edibles.

Popular demand frequently requires frozen blocks of ice cream to have cores of different colors and flavors patterned to symbolize a particular holiday or season and often to meet the demand for a particular flavor combination. It has been found very expensive and difficult to combine various constituents of a composite ice cream product without entailing appreciable labor and expense. A small retail dealer experiences considerable difficulty in handling machine-made products of this type sold by the ice cream manufacturer because his daily requirements must be determined in advance. Frequent losses are sustained, either by the manufacturer in the form of returns because the demand did not meet expectations, or, if returns are not permitted, by the dealer who will thereafter seek to minimize his losses by ordering smaller quantities and thereby fail to have a sufficient quantity on hand when called for by his trade.

An object of this invention is to provide a practical and simple device that is particularly adapted for use by small dealers for incorporating frozen inserts in blocks of ice cream in the usual cartons designed to receive bulk ice cream and to be packed by the dealers, while the customer waits, thus eliminating the difficulties heretofore experienced in anticipating and ordering in advance from the ice cream manufacturer the proper quantity of each combination of flavors of machine-made products to meet daily requirements.

To this end, the invention contemplates a shell or hood which may be provided in a number of sizes corresponding to the sizes of cartons to be used and a die associated therewith interchangeably to fit in a simple manner the different sizes of hoods whereby hollow cores may be readily formed in bulk ice cream packed in cartons by the dealers as ordered and inserts of different shapes, colors and flavors may be injected in these hollow cores.

A further object of the invention is to provide a simple and efficient device of this type that readily cores bulk ice cream packed in cartons and injects ice cream of different flavors to readily meet the requirements of the average small dealer.

A still further object of the invention is to provide a device of this type that may be readily used also by small ice cream manufacturers who fail to have sufficient volume to use production equipment now available to them which is expensive and usually beyond their ability to purchase and operate.

Other objects and advantages of the invention will be readily apparent from the foregoing description when taken in connection with the accompanying drawing which forms a part hereof.

In the drawing:

Figure 1 is a perspective view of the device embodying the invention and showing it in position upon an ice cream carton;

Fig. 2 is an enlarged vertical sectional view of the same to illustrate the die and plunger rod in lower position;

Fig. 3 is a similar view at a reduced scale but showing the rod withdrawn and the die about to be lifted to remove the central portion of the ice cream and thereby form a hollow core;

Fig. 4 is a similar view but showing the parts in their next position of operation, the die being withdrawn with the ice cream therein to form a hollow core;

Fig. 5 illustrates the die filled with frozen material to form the insert that may be injected into the hollow core;

Fig. 6 is an enlarged detail view to show the manner of locking the die to the hood;

Figs. 7 and 8 are top plan views of the device illustrating the structure used to apply the same to cartons of different sizes; and Fig. 9 is a detail view illustrating the locking connection between the plunger head and the plunger rod.

The device comprises a shell or hood 1 adapted to telescope and embrace the open end of an ice cream carton 2 which is usually employed in the retail sale directly to the public of small quantities of ice cream in bulk form. Cartons of this kind are usually made in different sizes and have flaps 3 which close the open end of the cartons after they are filled. A skirt 4 is formed about the lower edge of hood 1 to assist in placing this hood over and upon the carton and to fold back the flaps as the hood is moved down to be seated upon the upper edge of the carton. Hood 1 is formed with cross flanges 5 at two opposed edges, the other two opposed edges 6 being cut slightly away so as to be lower than the underside of flanges 5.

Depending upon the size of hood 1 used for carton 2, slots 7 are cut in edges 6 either of a size to receive tongues 8, as shown in Fig. 7, or of a larger size to receive tongues 9, as shown in Fig. 8. Slots 7 may be of a depth equal to the thickness of a cover plate 10 on which tongues 8 and 9 are formed. Fig. 7 represents a larger size carton and hood than shown in Fig. 8, and hence, the distance crosswise is greater. When tongues 8 rest in slots 7, the side edges of tongues 9 form shoulders to abut against the inside wall of the sides of hood 1. Cover 10 is slipped into position before hood 1 is forced the entire distance downwardly upon carton 2. After hood 1 is moved into its position in carton 2, cover 10 will be prevented from shifting or being withdrawn. If a smaller size carton is used, the corresponding size of hood will have its slot 7 larger so as to receive tongues 9. The side edges of cover 10 will then form the shoulders abutting the inside wall of the sides of hood 1 in the same manner. Cover 10 is thereby held in the upper open end of hood 1 and prevented from shifting its position which, as will be hereinafter observed, is quite desirable in order to assure that the frozen edible of different color or flavor that is to be inserted is held in alignment with the hollow core while it is being injected.

Cover 10 is provided with an upstanding bearing flange 11 which is formed about an opening 12. The shape of opening 12 determines the cross-sectional configuration of the frozen edible to be inserted. An elongated die member 13 having a cross-sectional shape corresponding to the shape of opening 12 and that defined by bearing flange 11 is provided with a handle 14. Handle 14 is adapted to be detachably connected at 15 by means of pins 16 carried by the handle and slots 17 formed in an upstanding color 18 on die member 13. A plunger comprising a piston head 19 and a rod 20 is disposed for movement within die member 13, there being a detachable connection between the head and the rod to permit independent movement of the rod during the coring step. This detachable connection is shown in detail in Fig. 9 and comprises an elongated spring 21 having an inwardly curved portion 22 arranged to lie in a groove 23 in an upstanding collar 24 on head 19 and in a groove 25 on rod 20 when this groove 25 is in horizontal alignment with groove 23. Rotation of rod 20 will force spring portion 22 out of groove 25 to permit up or down movement of rod 20 with respect to head 19.

A second but smaller handle 26 is carried by the upper end of rod 20. Handle 26 may seat against the upper end of handle 14, but both rod 20 and handle 26 are movable relative to handle 14.

The operation or use of the device will now be described. The proper size of hood 1 for the size of carton that is to be packed with bulk ice cream will be selected for positioning over the upper open end of the carton with flaps 3 folded back, as shown in Fig. 1. Cover plate 10 will be selected according to the pattern of insert to be injected into the ice cream in carton 2. If it is rectangular, as shown in the drawing for the purpose of illustration only, a correspondingly shaped die 13 will be selected and assembled to handle 14 by the detachable connection 15. Handle 14 will carry rod 20 and the second handle 26. Head 19 of the plunger will be inserted into die 13 and rod 20 allowed to pass through the central opening in collar 24 so that this head 19 will lie in the upper end of die 13. The lower edge of die 13 is formed into a sharp cutting edge designated 28. This edge is inserted within bearing flange 11, as shown in Fig. 1, and passed through opening 12 so as to be pressed into and through the ice cream in carton 2, as shown in Fig. 2. Both handles 14 and 26 may be gripped in this step so that rod 20 will enter the ice cream independently of head 19. The next step involves removing rod 20, as shown in Fig. 3, and locking it to head 19. A passage or opening 29 is thereby formed in the ice cream, so that, when die 13 is lifted, as shown in Fig. 4, the ice cream within this die 13 will readily move with die 13 so as to form a clean cut hollow core shown in Fig. 4. Air may pass through opening 29 to destroy any suction effect that may be created when the ice cream within die 13 is lifted upwardly. Die 13, both handles 14 and 26 and the plunger are removed as a unit, as shown in Fig. 4, with the ice cream in die 13 that has been withdrawn to form the hollow core. This ice cream is then removed from die 13 by operation of the plunger and placed with the bulk ice cream in the larger cans from which carton 2 is packed. Die 13 is then forced into a new bulk of frozen edible of a different color or flavoring to fill the same as shown in Fig. 5. Die 13 is then filled with the new frozen edible of a different color or flavor, or even of different kind, to a height greater than the height of the hollow core thus formed in order that there will be sufficient material to compensate for the space occupied by the die 13 and thus fill the entire hollow core. This step of the operation is accomplished by locking die 13 and flange 11 together by means of a spring latch 30 having a pin 31 extending inwardly for engagement in an opening 32 in the lower portion of die 13. Spring latch 30 tends to force pin 31 outwardly and requires the thumb of the operator to hold it in opening 32. The die 13 is locked into position in this manner, the new frozen edible is in alignment with the hollow core. Cover 10 cannot shift, as previously explained, and consequently, this new material will be forced into the hollow core so as to form a relatively uniform insert in the ice cream in container 2 and fill the hollow core, giving an appearance that the both materials were frozen in this relation, and hence, a very commercially satisfactory product.

Although the device is particularly useful to a small dealer whose sales are limited and cannot afford to order large quantities of brick ice cream, it is also useful to small ice cream manufacturers because it affords a simple and inexpensive means operable in a simple way to produce inserts in bulk ice cream after it is packed in cartons ready for sale. The device has a further utility in that its parts are so constructed that they may be used to produce inserts in bulk ice cream in cartons of different sizes by the mere substitution of a single head plate that may be slipped into operative relation with a correspondingly different size of hood and receiving the other parts of the device in the same manner. Moreover, the size and cross-sectional shape of the insert may likewise be readily changed and a variety of patterns made by having a set of dies of appropriate patterns that may be used as desired. Simplicity of structure and ease of operation are important features in a device of this kind. Skill is not required in the use of the device herein disclosed in order to assure proper centering of the insert because the parts are so related that such centering is a matter of certainty.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In a device of the class described, the combination of a housing adapted to telescope and embrace the open end of an ice cream container, a die member movable relative to said housing adapted to enter said container, a plunger movable in said die member, said plunger including a head and a rod, and a detachable connection between said head and said rod whereby said die member and said rod may enter the ice cream in said container independently of said head and thereafter said rod may be withdrawn before said die member from the ice cream.

2. In a device of the class described, the combination of a housing adapted to telescope and embrace the open end of an ice cream container, a core member movable relative to said housing adapted to enter said container, a plunger movable in said core member, said plunger including a head and a rod, and a connection between said head and said rod by means of which said head and said rod may be connected or disconnected by the rotation of said rod.

3. In a device of the class described, the combination of a housing adapted to telescope and embrace the open end of an ice cream container, a core member movable relative to said housing adapted to enter said container, a plunger movable in said die member, said plunger including a head and a rod, said head having an opening therein through which said rod may move, and means on said head for engaging one end of said rod by rotation of said rod whereby to lock said rod to said head.

4. In a device of the class described, the combination of a housing adapted to telescope and embrace the open end of an ice cream container, a core member movable relative to said housing adapted to enter said container, a plunger movable in said die member, said plunger including a head and a rod, said head having an opening therein through which said rod may move, and means for detachably connecting said head to said rod.

5. In a device of the class described, the combination of a housing adapted to telescope and embrace the open end of an ice cream container, a die member movable relative to said housing adapted to enter said container, a handle detachably connected to said housing, a plunger axially movable with respect to said die member comprising a head disposed for movement within said die member and a rod adapted to be detachably connected to said head, said rod movably disposed within said die member and said handle, means on the outer end of said rod projecting from said handle for limiting the inward movement of said rod within said die member, and means for detachably connecting said head to the inner end of said rod.

6. In a device of the class described, the combination of a housing adapted to telescope and embrace the open end of an ice cream container, the upper end of said housing being partially closed to seat upon the upper edge of said container at its said open end, a cover for closing the open portion of said upper end of said housing, means for centering said cover over said open portion and for detachably holding the same in its centered position when said housing is in position upon the open end of the ice cream container, a core member movable relative to said housing adapted to enter said container, said cover having an opening therein substantially of the same cross-section as that of said die member for receiving said die member, and a plunger movable with respect to said die member comprising a head disposed for movement within said die member and a rod for actuating said head.

7. In a device of the class described, the combination of a housing adapted to telescope and embrace the open end of an ice cream container, a removable cover for said housing, there being means to center and hold said cover upon said housing, a core member movable relative to said housing adapted to enter said container, said covering having an opening therein for receiving said die member, and a plunger movable with respect to said die member comprising a head disposed for movement within said die member and a rod for actuating said head.

8. In a device of the class described, the combination of a housing having an open top adapted to telescope and embrace the open end of an ice cream container, means on said housing for seating upon two opposed edges of said container to limit the downward movement of said housing upon said container, a cover for said open top of said housing having an opening therein, a die member movable relative to said housing adapted to enter said container through said cover opening, means for holding said cover in a predetermined position over said open top of said housing for predetermining the position said die member enters said container, and a plunger including a head and a rod, said head being disposed for movement in said die member by said rod.

9. In a device of the class described, the combination of a housing having an open top adapted to telescope and embrace the open end of an ice cream container, inwardly extending flanges along two opposed edges of said housing at its said open top to engage corresponding edges on said container to limit the downward movement of said housing upon said container, a cover for said open top of said housing having an opening therein, a die member movable relative to said housing adapted to enter said container through said cover opening, a plunger including a head disposed for movement within said die member and a rod for actuating said head, said cover having two of its ends adapted to seat under said inwardly extending flanges to hold said cover from outward displacement, there being means along the other two opposed edges of said cover cooperating with the corresponding edges of said housing for predetermining the position of said cover relative to said housing during the operation of said die member and said plunger.

10. In a device of the class described, the combination of a housing having an open top adapted to telescope and embrace the open end of an ice cream container, inwardly extending flanges along two opposed edges of said housing at its said open top to engage corresponding edges on said container to limit the downward movement of said housing upon said container, a cover for said open top of said housing having an opening therein, a die member movable relative to said housing adapted to enter said container through said cover opening, a plunger including a head disposed for movement within said die member and a rod for actuating said head, said cover having two of its ends adapted to seat under said inwardly extending flanges to hold said cover from outward displacement, there being means along the other two opposed edges of said cover cooperating with the corresponding edges of said housing for predetermining the position of said cover relative to said housing during the operation of said die member and said plunger, and means for locking said die member to said cover when said plunger is actuated to inject the contents of said die member into said container.

ROBERT C. McCOY.